May 19, 1931. W. SELIGMANN 1,806,182
WORKHOLDER FOR MATERIAL WORKING APPARATUS
Filed Dec. 15, 1927
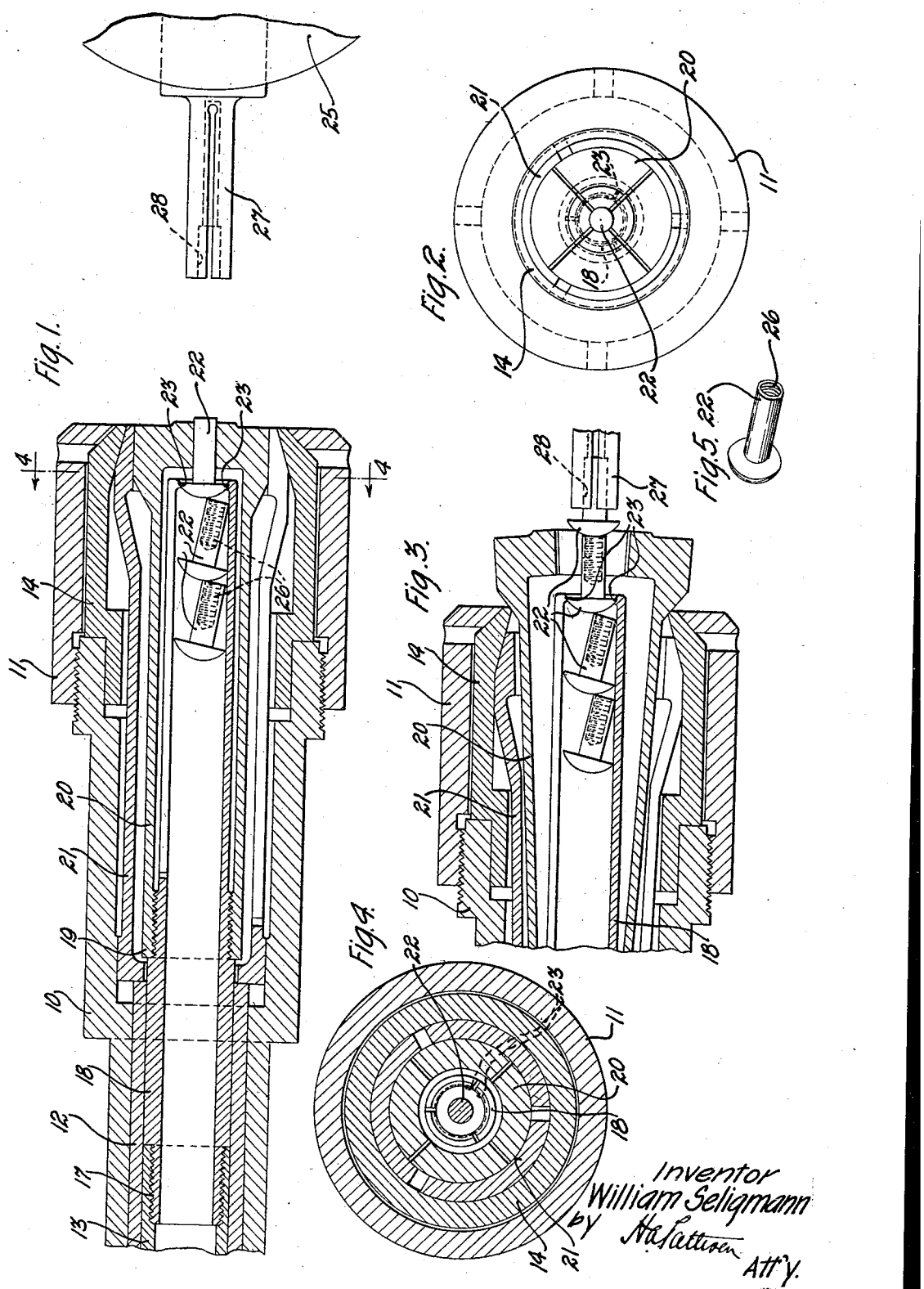
Inventor
William Seligmann
by *H. A. Lattwesen*
Att'y.

Patented May 19, 1931

1,806,182

UNITED STATES PATENT OFFICE

WILLIAM SELIGMANN, OF CHICAGO, ILLINOIS, ASSIGNOR TO WESTERN ELECTRIC COMPANY, INCORPORATED, OF NEW YORK, N. Y., A CORPORATION OF NEW YORK

WORKHOLDER FOR MATERIAL WORKING APPARATUS

Application filed December 15, 1927. Serial No. 240,126.

This invention relates to a work holder for material working apparatus, and more particularly to a collet mechanism adaptable primarily to automatic screw machines.

The primary object of this invention is to provide a work holder designed to facilitate and expedite the insertion and holding of an article on which work is desired to be performed.

In accordance with one embodiment of this invention as applied to the spindle of an automatic screw machine, there is provided apparatus which is particularly adapted for first receiving and then holding headed articles requiring operations on their shanks, comprising a slotted spring collet surrounded by a slotted spring locking sleeve. In the operation of the screw machine the locking sleeve is retracted and the collet is moved outwardly and open sufficiently for the passage of the head of an article between the jaws thereof, the shank of the article being held in a slotted spring holder carried by a tool turret of the screw machine. The head of the article after being passed between and to the rear of the collet jaws is gripped by a slotted spring adapter sleeve movable with the collet and arranged within the interior thereof. Upon a retraction of the spring holder the collet and locking sleeve are returned to their operative positions, the collet closing around the shank of the article and thereafter locked by the sleeve, the head of the article still being gripped by the adapter sleeve. Upon completion of the work to be performed on the shank of the article the collet is released and moved outwardly to permit the insertion of another article, which during the insertion thereof engages the previously worked article and pushes it from the adapter sleeve and into the interior thereof and is in turn gripped thereby.

Other objects and advantages of this invention will more fully appear from the following detailed description taken in connection with the accompanying drawings which illustrate one embodiment of this invention, in which Fig. 1 is a longitudinal sectional view of an article receiving and holding apparatus embodying the features of this invention as applied to the spindle of an automatic screw machine, shown fragmentarily;

Fig. 2 is an end view of the outer end of the spindle with the apparatus of this invention mounted thereon;

Fig. 3 is a fragmentary view of Fig. 1 showing the position of the apparatus during the mounting of an article therein;

Fig. 4 is a vertical section on the line 4—4 of Fig. 1, and

Fig. 5 is a perspective view of a finished article which one embodiment of the apparatus of this invention is adapted to handle.

Referring now to the drawings in detail wherein like reference numerals indicate similar parts throughout the several views, a rotary hollow spindle 10 counterbored at its forward end is provided upon its periphery at its extreme forward end with screw threads upon which a cap 11 is threaded. Sliding in the bore of the spindle 10 is a collet locking tube 12 and in turn slidable therein is a collet feed tube 13 which are operated in proper sequence by cam mechanism (not shown) in a manner well understood to those skilled in the art. Associated with the forward end of the spindle 10 within a counterbore thereof is an extension collar 14 which is also counterbored. The collar 14 is locked in position upon the spindle 10 by cooperating external and internal sloping surfaces formed upon the forward ends of the collar 14 and the cap 11, respectively, a sliding fit being provided between external and internal peripheral surfaces of the collar 14 and cap 11 at the inner and forward ends thereof, respectively. Attached to the feed tube 13 by screw threads 17 is a slotted spring adapter sleeve 18 and attached to the latter upon a shouldered peripheral surface thereof by screw threads 19 is a slotted spring collet 20. As clearly shown in Figs. 2 and 4 the adapter sleeve 18 and collet 20 are provided with three and four fingers or jaws, respectively, thus preventing the several sets of slots formed therein from coinciding. The jaws on the adapter sleeve 18 are of the contractile type, while those of the collet 20 are expansive.

Movable with the collet locking tube 12 when the latter is operated toward the right (Fig. 1) is a slotted spring locking sleeve 21, which, as clearly shown in Figs. 2 and 4, is provided with three expansive fingers or jaws, the inner arc-shaped surfaces of which at their extreme forward ends engage similar outer surfaces provided upon the jaws of the collet 20 when the collet locking tube 12 is in its forward or operative position as shown in Fig. 1. The outer surfaces of the jaws of the locking sleeve 21 and the inner peripheral surface of the collar 14 are sloped and cooperate together when the sleeve 21 is moved to its operative position by the locking tube 12 to lock the closed jaws of the collet 20 about the shank of an article 22 provided with a round head. It may in some instances be preferable to form the inner peripheral sloping surface occurring on the collar 14 integral with the cap 11, thus eliminating the collar 14, in which case the forward end of the spindle 10 would be extended up to the inner end of the sloping surface on the cap 11.

Upon a retraction of the locking tube 12 in the operation of the screw machine the tension in the expansible jaws of the locking sleeve 21 cause the latter to follow the locking tube 12, the sloping surfaces of the jaws of the sleeve 21 riding up the inner sloping surface of the collar 14 to the position clearly shown in Fig. 3, thereby unlocking the collet 20. The inner surfaces of the jaws of the adapter sleeve 18 are each provided with similar uniformly arranged shallow V-shaped grooves 23, the outer surface of the jaws being sloped so that when the rounded outer surface of the head of the article 22 engages the jaws the latter will freely flex outwardly to permit the circular edge of the head to be inserted in the grooves 23 of the jaws, the contractile force of the latter gripping the article.

Positioned adjacent the forward end of the spindle (Fig. 1) is an intermittently rotatable and reciprocatory turret 25, which is shown fragmentarily. The turret 25 is of the usual type associated with an automatic screw machine and is well known to those skilled in the art, the turret being provided with a plurality of working tools which are uniformly spaced around the periphery thereof and stationary relative to the turret. In the set up of the screw machine for the particular article 22 which is to be provided with a screw threaded axial aperture 26 (Fig. 5) within the shank thereof is provided six tool positions, two drills and two taps (not shown) and two article holders 27, one of which is illustrated in the drawings, each drill, tap and holder being spaced 180° from its respective associate upon the periphery of the turret 25. This arrangement it will be apparent provides for the loading and unloading from the holders 27 of two articles and the drilling and tapping of two articles during each complete rotation of the turret. The holders 27 each comprise a slotted spring sleeve provided at its outer end with an aperture 28 conforming to the size and shape of the article it is to load into the collet 20 and at its inner end it is fitted into an aperture provided in the turret 25 and suitably secured thereto. Any suitable hopper and magazine feed chute (not shown) for the articles 22 may be associated with the holders 27 in such a manner that the latter in the rotation and reciprocation of the turret may take the articles from the chute and carry them to the collet 20.

In the operation of the automatic screw machine of the type hereinbefore referred to and provided upon its spindle 10 with the apparatus of this invention, the spindle is caused to rotate intermittently in opposite directions, counterclockwise as viewed in Fig. 2 during the drilling and tapping operations and in a reverse direction during the retraction of the tap upon completion of the threading operation. The collet feeding and locking tubes 13 and 12, respectively, are operated at predetermined intervals in timed relation to each other, the reversal of rotation of the spindle and the operation of the turret 25 which is intermittently rotated and reciprocated also occur at predetermined intervals in timed relation. The means for operating the various elements of the automatic screw machine in timed relation to each other are well known in the art and therefore a detailed disclosure and description thereof is not believed necessary for a complete understanding of this invention. It will be understood that during the reciprocation of the turret 25 toward or from the spindle 10 the longitudinal axis of the aligned tool (not shown) or the article holder 27 is coincident with the axis of rotation of the spindle 10.

Beginning with the position of the parts as shown in Fig. 1, wherein an article 22 has just previously been delivered to and received by the jaws of the adapter sleeve 18 by the retracted empty article holder 27 of the turret 25 and the collet 20 has been operated by the actuation of the feed tube 13 to close the jaws thereof about the shank of the article and the locking sleeve 21 operated by an actuation of the locking tube 12 to lock the collet, the operation is as follows:

The turret 25 is rotated 60° from the position thereof shown in Fig. 1 to position a drill carried thereby (not shown) in line with the axis of the article 22 in the collet 20, the turret then moves toward the left and feeds the drill into the end face of the shank of the article which is being rotated with the spindle 10, thereby forming the aperture 26. Upon completion of the drilling operation the turret is retracted to withdraw the drill from the article and the turret is again indexed 60° to move into position a tap (not shown), which is then fed into the aperture 26 to cause a threading thereof. The turret then moves back again to withdraw the tap and simultaneously therewith the direction of rotation of the spindle 10 is reversed, which it will be apparent unthreads the article from the receding tap. After the tap leaves the threaded aperture 26 of the article 22 and by the time the turret 25 is indexed another 60° to align the second holder 27 with an article held in the jaws thereof ready to be inserted in the adapter sleeve 18, the collet locking and feed tubes 12 and 13, respectively, are operated in timed relation to first permit the locking sleeve 21 to move to the left (Fig. 1) to the position shown in Fig. 3, which permits the collet 20 to move toward the right (Fig. 1) and outside of the end of the cap 11 to the position shown in Fig. 3, the jaws of the collet flexing outwardly sufficiently to permit the head of the next article 22 to pass therethrough. In this latter position of the collet 20, outer sloping surfaces of the jaws thereof come to a rest against the inner peripheral surface of the collar 14. As the jaws of the collet move away from the shank of the drilled and tapped article 22 the latter is still held by the jaws of the adapter sleeve 18. The direction of rotation of the spindle 10 is again reversed in preparation for the drilling and tapping of the article 22 carried in the holder 27 and just indexed into position. The turret again moves to the left (Fig. 1) to load the collet 20, the head of the article carried thereby engaging the end surface of the shank of the completed article still gripped by the adapter sleeve 18 (Fig. 3) and pushes it ahead of it, the jaws of the adapter sleeve expanding, thus the head of the article is released from the grooves 23 in the jaws. The completed article 22 is pushed into the interior of the sleeve 18, the following article to be drilled and tapped being gripped by the jaws of the adapter sleeve 18 and left there as the turret 25 is again retracted to the position shown in Fig. 1. Successive deliveries of the article 22 within the interior of the sleeve 18 form a train thereof which finally passes to the rear of the spindle 10 and falls therefrom into a container (not shown). The collet 20 is again closed, the jaws thereof engaging the shank of the article and thereafter are locked by the locking sleeve 21 and thereafter in the continued operation of the machine it performs the same cycle of operations hereinbefore described.

It will be apparent that when an article is to be handled, which is without the range of the adapter sleeve 18 and the collet 20 shown and described herein for handling the particular article 22, illustrated, that the collet may be readily removed from the sleeve 18 at the threads 19, while the parts are in the position shown in Fig. 3, and thereafter the sleeve 18 may be removed from the tube 13 at the threads 17. If it is necessary to change the holder 27 it also may be readily removed from the turret and another one substituted.

Although the invention has been disclosed and described for the handling of a particular shaped article, it is clear that it may have a more general application and that modifications can be made without departing from the spirit and scope of the appended claims.

What is claimed is:

1. In a work holder, means operable to clamp an article moved relatively thereto, and means carried thereby for receiving the article after a portion of the article has been moved through the clamping means and holding it in a predetermined position for a subsequent operation of the first means to clamp the article.

2. In a work holder, an expansible member operable to clamp an article moved into operative association therewith, and means positioned therein for receiving the article after a portion thereof has been inserted through the member and holding the article in a predetermined position for a subsequent operation of the member to clamp it.

3. In a work holder, a slotted tubular member operable to clamp an article moved into operative position therewith, and means carried thereby comprising a plurality of tensioned fingers for gripping the article after a portion thereof has been moved past the clamping portion of the slotted tubular member and holding it in a predetermined position for a subsequent operation of the member to clamp the article.

4. In a work holder, an expansible member operable to clamp an article moved into operative association therewith, and means positioned therein comprising a plurality of tensioned fingers for gripping the article after a portion thereof has been inserted through the member and holding it in a predetermined position for a subsequent operation of the member to clamp the article.

5. In a work holder, a hollow element, an expansible member operative therein upon relative movement in a longitudinal direction therebetween to cause alternate clamping and releasing of an article moved into operative position therein, means positioned within the member for receiving and holding the article in a predetermined position after a portion thereof has been inserted through the member for a subsequent clamping thereof and upon its release.

6. In a work holder, a hollow element, a collet operable therein upon relative movement in a longitudinal direction therebetween to cause an alternate clamping and releasing of an article moved into operative position therein, and means comprising a split sleeve fixedly positioned within the collet for receiving and holding the article in a predetermined position for a subsequent clamping thereof and upon its release.

7. In an apparatus for receiving and holding articles requiring operations on their shanks on a spindle of an article working apparatus, a collet within the spindle, means within the collet for receiving and holding an article moved into operative position with the collet in a predetermined position for a subsequent clamping of the collet on the shank thereof and upon its release, the positioning of another article on the spindle serving to eject the previously positioned article, and means for operating the collet to clamp the article.

8. In an apparatus for receiving and holding headed articles requiring operations on their shanks on a spindle of an automatic screw machine, a spring collet within the spindle, means within the collet for receiving the head of an article moved into operative position within the collet and thereby holding the article in a predetermined position for a subsequent operation of the collet, and means for clamping the collet on the shank of the article.

9. In an apparatus for receiving and holding articles requiring operations on their shanks on a spindle of an article working apparatus, a spring collet within the spindle, cooperating surfaces on the spindle and the collet for causing alternate clamping and releasing of the collet on the shank of an article upon longitudinal movements in opposite directions of the collet, means longitudinally movable with the collet for receiving and holding an article moved into operative position with the collet in a predetermined position before and after the clamping and releasing of the article, and means for causing the collet to move longitudinally.

10. In a work holder, an expansible member operable to clamp an article moved relatively thereto, and means positioned therein and carried thereby for receiving the article inserted through the member and holding it in a predetermined position for a subsequent operation of the expansible member to clamp the article.

11. In a work holder, an expansible member operable to clamp an article moved relatively thereto, and a contractive means positioned therein for receiving the article inserted through the member and holding it in a predetermined position for a subsequent operation of the expansible member to clamp the article.

12. In a work holder, a collet for clamping the shank of a partly formed article during machining operations thereon, a tubular sleeve positioned within the collet and movable longitudinally therewith for gripping the head of the partially formed article to position the shank thereof for subsequent engagement by the collet.

13. In a work holder for material working apparatus, a slotted spring collet for clamping a partly formed article by its shank, a tubular resilient sleeve positioned within the collet and movable therewith for engaging the head of the partly formed article prior to and subsequent to the clamping thereof by the collet, and means for releasing the collet from the article to permit the insertion of a second article into the tubular sleeve.

14. In a work holder for material working apparatus, a slotted spring collet for clamping a partly formed article by its shank, a tubular resilient sleeve positioned within the collet and movable therewith for engaging the head of the partly formed article prior to and subsequent to the clamping thereof by the collet, means for releasing the collet from the article to permit the insertion of a second article into the tubular sleeve, said collet and sleeve being so positioned that the second mentioned article will force the head of the first mentioned article out of engagement with the resilient sleeve and simultaneously position itself in the sleeve adjacent the collet.

15. In a work holder for article forming apparatus, resilient means for receiving an article, means for clamping the article in position to be worked upon, a slotted article holding member positioned within the clamping means for receiving an article from said resilient means and holding said article in a predetermined position, and means for actuating the clamping means and the slotted article holding member to permit the passage of a portion of the article through the clamping means and into engagement with the slotted article holding member.

16. In a work holder for article forming apparatus, resilient means for receiving an article, means for clamping the article in position to be worked upon, a slotted article holding member having an article clamping portion and positioned within the clamping means for receiving an article from said resilient means and holding said article in a predetermined position, and means for actuating the clamping means and the slotted article holding member to permit the passage of a portion of the article through the clamping means and into engagement with the article holding member, said clamping means and article holding member being positioned to permit an article in the resilient means to force the article previously worked on out of engagement with the article clamping portion of the article holding member.

In witness whereof, I hereunto subscribe my name this 29 day of November, A. D. 1927.

WILLIAM SELIGMANN.